(12) United States Patent
Brutto et al.

(10) Patent No.: US 10,000,661 B2
(45) Date of Patent: Jun. 19, 2018

(54) NITROFUNCTIONAL POLYURETHANE DISPERSIONS FOR BINDER COMPOSITIONS

(71) Applicant: ANGUS Chemical Company, Buffalo Grove, IL (US)

(72) Inventors: Patrick E. Brutto, Bloomingdale, IL (US); George D. Green, Cary, IL (US); Zhenwen Fu, North Wales, PA (US); Eric C. Greyson, Blue Bell, PA (US); Andrew Hejl, Lansdale, PA (US); Jia Tang, Phoenixville, PA (US)

(73) Assignee: ANGUS Chemical Company, Buffalo Grove, IL (US)

( * ) Notice: Subject to any disclaimer, the term of this patent is extended or adjusted under 35 U.S.C. 154(b) by 0 days. days.

(21) Appl. No.: 14/649,259

(22) PCT Filed: Nov. 13, 2013

(86) PCT No.: PCT/US2013/069801
§ 371 (c)(1),
(2) Date: Jun. 3, 2015

(87) PCT Pub. No.: WO2014/088766
PCT Pub. Date: Jun. 12, 2014

(65) Prior Publication Data
US 2015/0307742 A1    Oct. 29, 2015

Related U.S. Application Data

(60) Provisional application No. 61/734,145, filed on Dec. 6, 2012.

(51) Int. Cl.
| | |
|---|---|
| *C09D 175/12* | (2006.01) |
| *C08G 18/66* | (2006.01) |
| *C08G 18/75* | (2006.01) |
| *C08G 18/08* | (2006.01) |
| *C08G 18/34* | (2006.01) |
| *C08G 18/38* | (2006.01) |
| *C08G 18/42* | (2006.01) |
| *C09J 175/12* | (2006.01) |

(52) U.S. Cl.
CPC ....... *C09D 175/12* (2013.01); *C08G 18/0823* (2013.01); *C08G 18/348* (2013.01); *C08G 18/384* (2013.01); *C08G 18/4238* (2013.01); *C08G 18/6633* (2013.01); *C08G 18/758* (2013.01); *C09J 175/12* (2013.01); *C08G 2170/80* (2013.01); *C08G 2190/00* (2013.01)

(58) Field of Classification Search
CPC .... C09D 175/12; C09J 175/12; C08G 18/384; C08G 18/0823; C08G 18/4238; C08G 18/6633; C08G 18/758
See application file for complete search history.

(56) References Cited

U.S. PATENT DOCUMENTS

| | | | | |
|---|---|---|---|---|
| 3,375,220 A | * | 3/1968 | Clark | C08G 18/3806 106/18.14 |
| 4,672,000 A | | 6/1987 | Linden | |
| 2006/0122330 A1 | * | 6/2006 | Wu | C08F 8/30 525/127 |
| 2007/0010612 A1 | * | 1/2007 | Rouge | C08G 18/0823 524/501 |
| 2009/0253858 A1 | | 10/2009 | Argyropoulos et al. | |
| 2011/0014388 A1 | * | 1/2011 | Brainard | B05D 3/0227 427/514 |
| 2012/0149841 A1 | | 6/2012 | Yamada et al. | |

FOREIGN PATENT DOCUMENTS

| | | | | |
|---|---|---|---|---|
| JP | 02192013 A | * | 7/1990 | G11B 5/702 |
| WO | WO 2009114329 A2 | * | 9/2009 | C08G 18/2875 |

OTHER PUBLICATIONS

Document N_English Translation.*
Developments in Polyurethanes, vol. 1, J.M. Burst, ed., Applied Science Publishers, pp. 1-76, 1978.
High Polymers, vol. XVI: "Polyurethanes, Chemistry and Technology," by Saunders and Frisch, Interscience Publishers, vol. 1, pp. 32-42, 44-54 (1962) and vol. II pp. 5-6, 198-199 (1964).
International Preliminary Report on Patentability for PCT/US2013/069801, dated Jun. 9, 2015.
International Search Report and Written Opinion for PCT/US2013/069801, dated Aug. 7, 2014.

(Continued)

*Primary Examiner* — Michael L Leonard
(74) *Attorney, Agent, or Firm* — Foley & Lardner LLP

(57) ABSTRACT

Provided is a binder composition and its use in aqueous based paints and coatings and other applications. The binder composition comprises: a polyurethane dispersion containing water and a polyurethane polymer, wherein the polyurethane polymer is prepared by reacting a nitroalcohol compound, a polyol compound, a polyisocyanate compound, and optionally chain extenders, wherein the nitroalcohol compound is of formula I, wherein R, R$^1$, and Z are as defined herein.

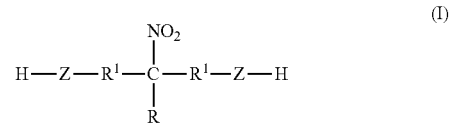

(I)

22 Claims, No Drawings

(56) References Cited

OTHER PUBLICATIONS

Organic Polymer Chemistry by K.J. Saunders, Chapman and Hall, London, pp. 323-325, 1973.
Notice of Reasons for Rejection issued on Japanese Application 2015-546487, dated Jul. 10, 2017, English Translation only.
Clariant, "Additives used in Flame Retardant Polymer Formulations: Current Practices and Trends", Workshop at NIST, Sep. 30, 2009, 28 pages.
Communication issued on European Application 13854218.8, dated Apr. 11, 2017.

* cited by examiner

NITROFUNCTIONAL POLYURETHANE DISPERSIONS FOR BINDER COMPOSITIONS

CROSS-REFERENCE TO RELATED APPLICATIONS

This applications is a 371 National Phase Application of PCT/US2013/069801, filed Nov. 13, 2013, which claims priority from U.S. provisional application Ser. No. 61/734,145, filed Dec. 6, 2012, which are incorporated herein by reference in their entireties.

FIELD

This invention relates generally to binder compositions and their use in aqueous based paints and coatings and other applications. More specifically, the invention relates to nitrofunctional polyurethanes for such use.

BACKGROUND

Paint and coating formulations are ubiquitous in today's societies. They are used on a wide variety of surfaces, for instance, metal, wood, plastics, brick, wallboard, etc., and for many functions, such as surface protection from chemical and/or physical hazards, for decoration, and/or waterproofing.

Paints and coatings are typically composed of a binder material, a carrier or solvent, together with various other additives. The other additives may include, for instance, neutralizers, antimicrobials, pigments, uv absorbers, etc. The binders provide a network in which the other additives are dispersed and suspended. Binders also function as the primary film forming component of the finished coating, provide integrity and adhesion for the coated film and overall protect the substrate from the external environment. Generally, there are two classes of binders: latex binders, which are used in aqueous based formulations, and alkyd-based binders, which are used in non-aqueous formulations, ultimately resulting in latex paints and coatings and alkyd paints and coatings, respectively.

Aqueous based paints and coatings use water as the main carrier instead of an organic solvent. As a result, they are generally lower volatile organic content (VOC) materials and are therefore favored in some applications and regions where low VOC is desired or required. Aqueous based paints and coatings, however, may not provide the equivalent properties to their alkyd-based counterparts. For instance, they may not provide sufficient protection against chemical or physical hazards, or as good adhesion to the substrate. Consequently, a continuing need exists to discover ways for improving the properties of aqueous based paints and coatings.

The problem addressed by this invention is the provision of binder compositions for use, for example, in aqueous based paints and coatings that yield improved properties over known systems including, for instance, improved hardness development.

STATEMENT OF INVENTION

We have now found that the functionalization of polyurethanes with nitro groups improves various properties of the composition. Advantageously, when the nitrofunctional polyurethane is used as a binder in an aqueous based paint or coating or other formulations, the formulation may exhibit better hardness development.

In one aspect, there is provided a binder composition, the composition comprising: a polyurethane dispersion containing water and a polyurethane polymer, wherein the polyurethane polymer is prepared by reacting a nitroalcohol compound, a polyol compound, a polyisocyanate compound, and optionally chain extenders, wherein the nitroalcohol compound is of formula I:

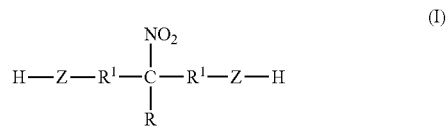

wherein R is H, $CH_3$, $CH_3CH_2$, or a group of formula $R^1$—Z—H, $R^1$ is —$(CH_2)_x$—, —$CH(CH_3)$—, —$CH(CH_2CH_3)$—, or —$CH(C_6H_5)$—, wherein x is 1-6, and Z is O or $NR^4$, wherein $R^4$ is H or linear or branched $C_1$-$C_6$ alkyl.

In another aspect, there is provided an aqueous based paint or coating comprising a carrier and a binder, wherein the binder is a composition as described herein.

DETAILED DESCRIPTION

Unless otherwise indicated, numeric ranges, for instance as in "from 2 to 10," are inclusive of the numbers defining the range (e.g., 2 and 10).

Unless otherwise indicated, ratios, percentages, parts, and the like are by weight.

As noted above, in one aspect the invention provides a binder composition. The composition comprises a polyurethane dispersion containing water and a polyurethane polymer. The polyurethane polymer is prepared by reacting a nitroalcohol compound, a polyol compound, a polyisocyanate compound, and optionally chain extenders. The nitroalcohol compound is of formula I:

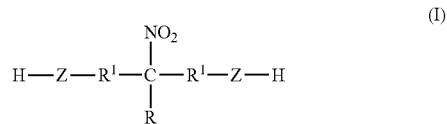

wherein R, $R^1$, and Z are as defined above.

In some embodiments, $R^1$ in the nitroalcohol compound of formula I is $CH_2$.

In some embodiments, Z is O.

In some embodiments, R is $CH_3$ or $CH_3CH_2$.

In some embodiments, R is $R^1$—Z—H. In some embodiments, $R^1$ is $CH_2$ and Z is O.

In some embodiments, the nitroalcohol compound of formula I is 2-nitro-2-methyl-1,3-propanediol (NMPD), 2-nitro-2-ethyl-1,3-propanediol (NEPD) or tris(hydroxymethyl)nitromethane (TN).

Polyurethane polymers useful in the practice of the present invention are prepared by the reaction of the nitroalcohol compound of formula I, a polyol, and a polyisocyanate. The polyisocyanate may be any known aromatic polyisocyanate, aliphatic polyisocyanate, or combinations thereof. These polyisocyanates include those containing at least about two isocyanate groups per molecule, preferably, those containing an average of from 2 to 3 isocyanate groups per molecule. Exemplary polyisocyanates include, but are not limited to, diphenylmethane diisocyanate (MDI), tolylene diisocyanate (TDI), 4,4'-diisocyanato dicyclohexylmethane (H12MDI), isophorone diisocyanate (IPDI), meta-tetramethylxylylene diisocyanate (TMXDI), 1,3/1,4-diisocyanatomethyl cyclohexane, and hexamethylene diisocyanate.

Polyols useful in the present invention are compounds which contain two or more groups that are reactive with isocyanates, generally active-hydrogen groups, such as —OH, primary or secondary amines, and —SH. Representative suitable polyols are generally known and are described for instance in such publications as *High Polymers*, Vol. XVI; "Polyurethanes, Chemistry and Technology," by Saunders and Frisch, Interscience Publishers, New York, Vol. I, pp. 32-42, 44-54 (1962) and Vol II. Pp. 5-6, 198-199 (1964); *Organic Polymer Chemistry* by K. J. Saunders, Chapman and Hall, London, pp. 323-325 (1973); and *Developments in Polyurethanes*, Vol. I, J. M. Burst, ed., Applied Science Publishers, pp. 1-76 (1978). Representative of suitable polyols include polyester, polylactone, polyether, polyolefin, polycarbonate polyols, and various other polyols.

In some embodiments, the polyol may have a number average molecular weight of 200 to 10,000. Preferably the polyol has a molecular weight of from 300 to 7,500. More preferably the polyol has a number average molecular weight of from 400 to 5,000. In some embodiments, the polyol will have a functionality of from 1.5 to 8. Preferably the polyol has a functionality of 2 to 4.

In some embodiments, polyols for use in the invention are polyester polyols, including for example, hydroxyl terminated linear polyesters. Specific examples include, without limitation, Fomrez® G24-112, a hydroxyl-terminated saturated linear polyester which is poly (ethylene/butylene adipate) glycol with 60/40 molar ratio of ethylene glycol/1,4-butanediol, available from Chemtura Corporation.

The polyurethane polymer may also contain a hydrophilic group, which may be introduced for instance through the polyol or through co-reactants. The term "hydrophilic group" as used herein, refers to an anionic group (for example, carboxyl group, sulfonic acid group, or phosphoric acid group), or a cationic groups (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide. Examples of hydrophilic groups include dialkylol alkanoic acid C6 to C24, e.g. 2,2-dimethylol propionic acid, and 2,2-dimethylol butanoic acid, sulfonic acid dio, e.g. 3-(2,3-dihydroxypropoxy)-1-propanesulfonic acid and aminosulfonic acid, e.g. 2-aminoethanesulfonic acid; and salts thereof, for example, salts of amines such as triethylamine, alkanolamine, morpholine, and/or alkali metal salts such as sodium salt.

The invention may include optional ingredients, such as chain extenders or crosslinkers, stabilizing agents, surfactants, solvents, catalysts, and the like. A chain extender is used to build the molecular weight of the polyurethane polymer by reaction of the chain extender with the isocyanate functionality in the polyurethane polymer, that is, chain extend the polyurethane polymer. A suitable chain extender or crosslinker is typically a low equivalent weight active hydrogen containing compound having about 2 or more active hydrogen groups per molecule. Chain extenders typically have 2 or more active hydrogen groups while crosslinkers have 3 or more active hydrogen groups. The active hydrogen groups can be hydroxyl, mercaptyl, or amino groups. An amine chain extender can be blocked, encapsulated, or otherwise rendered less reactive. Other materials, particularly water, can function to extend chain length and, therefore, can be chain extenders for purposes of the invention.

The chain extenders may be aliphatic, cycloaliphatic, or aromatic and are exemplified by triols, tetraols, diamines, triamines, and aminoalcohols. Illustrative examples of amine chain extenders include N-methylethanolamine, N-methylisopropylamine, 4-aminocyclohexanol, 1,2-diaminoethane, 1,3-diaminopropane, 1,2-diaminopropane, hexamethylene diamine, methylene bis(aminocyclohexane), isophorone diamine, 1,3- or 1,4-bis(aminomethyl) cyclohexane or blends thereof, diethylenetriamine, toluene-2,4-diamine, and toluene-1,6-diamine.

The polyurethane polymer of the invention may be prepared using general techniques that are known for making polyurethane dispersions. By way of example, the polyol(s) and the nitroalcohol compound are mixed in a solvent (e.g., methyl ethyl ketone). The polyisocyanate is added, along with an optional catalyst, such as bismuth octanoate, and the mixture heated (e.g., to about 70° C.). When the % NCO is at the theoretical amount, a weak base, such as triethylamine (TEA) may be added. The polymer is then dispersed in water at the desired solids content level and optionally chain extended. Chain extension, when carried out, can be done either before or after dispersion formation. The solvent may be removed under vacuum. In the above reaction, the diisocyanate is typically added in excess and so results in an isocyanate terminated polymer. The amount of NCO that should be left over when the alcohol groups are reacted can be calculated and the polymer reaction is run to this point.

The order of mixing/reaction between the starting materials is not critical. Indeed, in some embodiments, instead of reacting the polyol and nitroalcohol with the polyisocyanate, the nitroalcohol may first be reacted with the polyisocyanate to form a nitroisocyanate compound which is then reacted with the polyol. In some embodiments, such nitroisocyanate compound may, for example, be of the formula II:

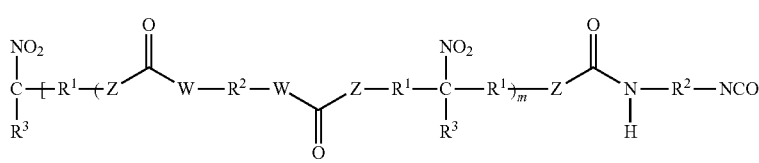

wherein W is O, $CH_2$, or $NR^5$, wherein $R^5$ is H or linear or branched $C_1$-$C_6$ alkyl, $R^2$ is —$(CH_2)_y$—, phenyl, tolyl, isophorone, cyclohexyl, dicyclohexylmethane, or diphenylmethane, wherein y is 1-6, $R^3$ is a bond, H, $CH_3$, or $CH_3CH_2$, m is 0-5, and n is 2 or 3.

In some embodiments, Z in formula II is O, R¹ is —CH₂—, and m is 0.

In some embodiments, R³ is a bond and n is 3.

In some embodiments, R³ is CH₃CH₂ and n is 2.

The polyurethane dispersion of the invention is useful as binder for an aqueous based paint or coating or for other formulations, such as adhesive, sealant, primer, caulk, or filler formulations.

A paint or coating may be used to provide a protective and/or decorative barrier for a variety of surfaces, including metal, wood, plastic, brick, wallboard, etc. For instance, it may be used for bridges, floors, transportation vehicles, metal and non-metal parts, exteriors and interiors of houses, and other buildings. The amount of the binder in paint or coating formulation of the invention can be the amount conventionally used, which can vary widely due to the protection requirements, gloss/sheen range, and also the solids concentration, of a specific paint formulation. By way of non-limiting examples, the amount of binder solids may be from about 2% to about 75%, alternatively from about 5% to about 65%, or alternatively from about 20% to about 55%, by weight based on the total weight of the formulation.

A typical paint or coating according to the invention may comprise, in addition to the binder composition, a carrier. A pigment may also be included where a pigmented paint or coating is desired. The formulation may contain other additives commonly used in paints and coatings including, but not limited to, additional binders, a neutralizing agent, leveling agents and surfactants and wetting agents, a thickener, a rheology modifier, co-solvents such as glycols, including propylene glycol or ethylene glycol, a corrosion inhibitor, a defoamer, a co-dispersant, a biocide, a coalescing agent, and/or a colorant.

The carrier in the paint or coating formulation is present in order to dissolve, disperse, and/or suspend the other formulation ingredients In the aqueous based formulations of the invention, the carrier is usually water, although other water-based solutions such as water-alcohol mixtures and the like may be used. The aqueous carrier generally makes up the balance of the formulation, after all the other ingredients have been accounted for.

Neutralizers may be included in aqueous based paints or coatings in order to neutralize residual acid moieties or to raise the pH to a desired value, sometimes between about 8 and 10. Suitable neutralizers are well known in the industry and include, without limitation, ammonia, 2-amino-2-methyl-1-propanol (AMP), dimethylethanolamine (DMEA), potassium hydroxide, sodium hydroxide, monoethanolamine, monoisopropanolamine, lithium carbonate, sodium carbonate, potassium carbonate, butyldiethanolamine, or diethylaminoethanol.

Pigments may be included to provide hiding power and a desired color to the final coated material and may also be used to provide bulk to the paint or coating. While multiple pigments may be present in end-use paints or coatings, sometimes only white pigment, such as titanium oxide, perhaps in combination with extender pigments such as calcium carbonate and/or kaolin clay, is added in the early stages of the formation of the formulation. Any other desired pigments of various colors (including more white pigment) can optionally be added at the later stages of, or after, the formulation is completed.

Pigments may be organic or inorganic. Examples of pigments can include, but are not limited to, titanium dioxide, kaolin clay, calcined kaolin clay, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, quinacridone magenta, quinacridone violet, and the like, and any combination thereof.

The paint and coating formulations of the invention may be manufactured by conventional paint manufacturing techniques, which are well known to those skilled in the art. Typically, the formulations are manufactured by a two-step process. First, a dispersion phase, commonly referred to as the grind phase, is prepared by mixing the dry pigments (if present) with other grind phase components, including most other solid powder formulation materials, under constant high shear agitation to provide a high viscosity and high solids mixture. This part of the process is designed to effectively wet and disperse the dry materials and stabilize them in an aqueous dispersion.

The second step of the paint manufacturing process is commonly referred to as the letdown or thindown phase, because the viscous grind is diluted with the remaining formulation components, which are generally less viscous than the grind mix. Typically, the binders, any predispersed pigments, and any other paint materials that only require mixing and perhaps moderate shear, are incorporated during the letdown phase. The letdown phase may be done either by sequentially adding the letdown components into a vessel containing the grind mix, or by adding the grind mix into a vessel containing a premix of the binder resins and other letdown components, followed by sequential addition of the final letdown components. In either case, constant agitation is needed, although application of high shear is not required.

Coatings formed from binders of the invention have been found to exhibit various favorable properties, including desirable hardness and/or chemical resistance. In some embodiments, coatings that comprise binders of the invention, when applied to an aluminum substrate, exhibit Konig or pendulum hardness as measured according to ASTM D4366 of at least 20 seconds, alternatively at least 23 seconds, alternatively at least 30 seconds, or alternatively at least 36 seconds, following 1 day of coating drying. In some embodiments, coatings that comprise binders of the invention, when applied to an aluminum substrate, exhibit Konig or pendulum hardness of at least 75 seconds, alternatively at least 100 seconds, following 7 days of coating drying.

Some embodiments of the invention will now be described in detail in the following Examples.

EXAMPLES

Example 1. Synthesis of Polyurethane Dispersion 1 (PUD 1) (Inventive Polymer)

A polymer having the composition 44.0 H12MDI (4,4'-diisocyanato dicyclohexylmethane)/42.5 Fomrez G24-112 (polyester polyol)/3.2 NEPD (2-nitro-2-ethyl-1,3-propanediol)/4.8 DMPA (dimethylolpropionic acid)/4.6 PDA (1,2-propane diamine) is prepared as follows:

A reactor is charged with 256.3 g Fomrez G24-112, 18.7 g NEPD, 28.5 g DMPA and 142.4 g methyl ethyl ketone (MEK) and stirred until homogeneous. 265.4 g H12MDI and Bismuth octanoate catalyst (0.028 g) are then added to the reactor and the mixture heated to the reaction temperature of 70° C. When the % NCO is 4.8%, 20.2 g triethylamine (TEA) is charged to the reactor and it is allowed to mix in for 10 minutes. The polymer is then dispersed in water (925 g). The polyurethane polymer is chain extended with 1,2-

PDA (26.2 g in 61.1 g water). The MEK solvent is removed under vacuum. The resulting dispersion has a solids content of 36.5% and a particle size of 43 nm.

Example 2. Synthesis of Polyurethane Dispersion 2 (PUD 2) (Control (Comparative) Polymer)

A polymer having the composition 44.5 H12MDI/43.0 Fomrez G24-112/3.2 Unoxol Diol/4.8 DMPA/4.6 PDA is prepared as follows:

A reactor is charged with 256.3 g Fomrez G24-112, 18.7 g Unoxol, 28.5 g DMPA and 142.4 g methyl ethyl ketone (MEK) and stirred until homogeneous. 265.4 g H12MDI and Bismuth octanoate catalyst (0.028 g) are then added to the reactor and the mixture heated to the reaction temperature of 70° C. When the % NCO is at 4.8%, 20.2 g TEA is charged to the reactor and it is allowed to mix in for 10 minutes. The polymer is then dispersed in water (1000 g). The polyurethane polymer is chain extended with 1,2-PDA (26.2 g in 61.1 g water). The MEK solvent is removed under vacuum. The resulting dispersion has a solids content of 33.7% and a particle size of 42 nm.

Example 3. Clear Coating Formulations and Testing

Clear Coating Formulations

The minimum film forming temperature (MFFT) is measured on the neat PUDs in order to estimate the amount of coalescent for binders able to form films under practical drying conditions. The measured MFFTs are shown in the Table 1 below. One percent butyl carbitol is added to each formulation (based on solid polymer) for every two degrees Celsius of MFFT greater than negative five. Following coalescent addition each PUD has Byk346 (silicone surfactant) added at 0.5% based on polymer solids.

Testing on Treated Aluminum

Coatings are applied to a treated aluminum panel (Q panel Type Al-412 chromate pretreated aluminum) using a drawdown bar with a 10 mil gap to yield dry films of approximately 2 mil thickness. The panels are air cured and the Konig hardness and chemical resistance are measured.

Konig or pendulum hardness is measured according to ASTM D4366 using a TQC SP0500 Pendulum Hardness Tester after 1 and 7 days of coating drying, and is reported in seconds.

The chemical resistance is tested after allowing the coatings to cure at room temperature for 7 days. Testing is performed by putting a 23 mm diameter Whatman filter paper on the board and saturating it with the chemical. The chemical puddles are then covered with caps to prevent/limit evaporation during the test. After 1 hour the chemical and filter paper are washed off and the board is dried. All satins are graded 1-5 where 5 means no visible sign or softening of the coating and 1 means complete removal/dissolution of the film. Results are shown in Table 1.

TABLE 1

|  | PUD 1 | PUD 2 |
| --- | --- | --- |
| MFFT | 40 | >50 |
| Konig Hardness*(seconds) |  |  |
| 1 day | 36.2 | 22.4 |
| 7 day | 106 | 108 |
| Chemical Resistance |  |  |
| Water | 4.5 | 5 |
| Formula 409 (cleaner) | 4.5 | 5 |
| Acetone | 4 | 5 |
| 50% EtOH (ethanol) | 4 | 5 |
| MEK | 3 | 4.5 |
| IPA (isopropanol) | 4 | 4.5 |

SUMMARY

The nitrofunctional polyurethanes of the invention exhibit a lower MFFT than the control PUD. The materials of the invention also showed improved early hardness development (Konig hardness relative to the control case).

What is claimed is:

1. An aqueous based paint or coating composition comprising:
   (a) a grind phase; and
   (b) a letdown phase comprising a binder, wherein the binder consists of:
      a polyurethane dispersion containing water and a polyurethane polymer, wherein the polyurethane polymer comprises polymerized monomers of a nitroalcohol compound, a polyol compound, a polyisocyanate compound, and optionally a chain extender,
   wherein:
   the nitroalcohol is a compound of formula I:

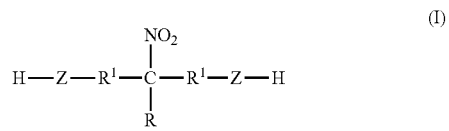

wherein R is $CH_3$, $CH_3CH_2$, or a group of formula $R^1$—Z—H,
   $R^1$ at each occurrence is independently —$(CH_2)_x$—, —$CH(CH_3)$—, or —$CH(CH_2CH_3)$—,
   wherein x is 1-3, and
   Z at each occurrence is O;
   and
   the polyisocyanate compound is selected from the group consisting of 4,4'-diisocyanato dicyclohexylmethane (H12MDI), isophorone diisocyanate (IPDI), 1,3/1,4-diisocyanatomethyl cyclohexane, and hexamethylene diisocyanate,
   wherein the aqueous based paint or coating is air cured.

2. The aqueous based paint or coating composition of claim 1 wherein the grind phase comprises a pigment.

3. The aqueous based paint or coating composition of claim 1 wherein $R^1$ at each occurrence is —$CH_2$—.

4. The aqueous based paint or coating composition of claim 1 wherein R is $CH_3$ or $CH_3CH_2$.

5. The aqueous based paint or coating composition of claim 1 wherein R is $R^1$—Z—H.

6. The aqueous based paint or coating composition of claim 1 wherein the nitroalcohol compound of formula I is 2-nitro-2-methyl-1,3-propanediol (NMPD), 2-nitro-2-ethyl-1,3-propanediol (NEPD), or tris(hydroxymethyl)nitromethane (TN).

7. The aqueous based paint or coating composition of claim 1 wherein the polyol comprises a polyester polyol.

8. The aqueous based paint or coating composition of claim 1 further comprising a neutralizer, wherein the aqueous based paint or coating composition has a pH of about 8 to 10.

9. The aqueous based paint or coating composition of claim 1 wherein the polyurethane polymer is prepared by:
mixing the nitroalcohol compound of formula I with the polyol compound prior to reaction with the polyisocyanate or;
reacting the nitroalcohol compound of formula I with the polyisocyanate to form a nitroisocyanate compound, followed by reaction with the polyol, wherein the nitroisocyanate is a compound of formula II:

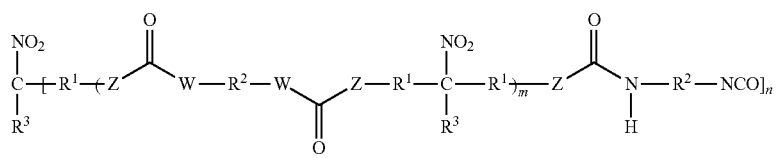

wherein W is $NR^5$,
wherein $R^5$ is H,
$R^2$ is $-(CH_2)_y-$, isophorone, cyclohexyl, or dicyclohexylmethane,
wherein y is 6,
$R^3$ is $CH_3$, $CH_3CH_2$, or a bond,
m is 0-5, and
n is 2 or 3 with the proviso when n is 2, $R^3$ is $CH_3$, or $CH_3CH_2$, and when n is 3, $R^3$ is a bond.

10. The aqueous based paint or coating composition of claim 1 wherein the polyisocyanate compound is 4,4' diisocyanato dicyclohexylmethane (H12MDI) or isophorone diisocyanate (IPDI).

11. An aqueous based paint or coating composition comprising:
(a) a grind phase; and
(b) a letdown phase comprising a binder, wherein the binder consists of:
a polyurethane dispersion containing water and a polyurethane polymer, wherein the polyurethane polymer comprises polymerized monomers of a nitroalcohol compound, a polyol compound, a polyisocyanate compound, and optionally chain extenders,
wherein:
the nitroalcohol is a compound of formula I:

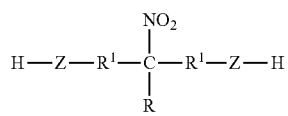

wherein R is $CH_3$, $CH_3CH_2$, or a group of formula $R^1-Z-H$,
$R^1$ at each occurrence is independently $-(CH_2)_x-$, $-CH(CH_3)-$, or $-CH(CH_2CH_3)-$,
wherein x is 1-3, and
Z at each occurrence is O;
and
the polyisocyanate compound is selected from the group consisting of 4,4'-diisocyanato dicyclohexylmethane (H12MDI), isophorone diisocyanate (IPDI), 1,3/1,4-diisocyanatomethyl cyclohexane, and hexamethylene diisocyanate;
wherein the composition when applied to an aluminum substrate and air cured for one day has a pendulum hardness of at least 30 seconds.

12. The aqueous based paint or coating composition of claim 11 wherein the grind phase comprises a pigment.

13. The aqueous based paint or coating composition of claim 11 wherein $R^1$ at each occurrence is $-CH_2-$.

14. The aqueous based paint or coating composition of claim 11 wherein R is $CH_3$ or $CH_3CH_2$.

15. The aqueous based paint or coating composition of claim 11 wherein R is $R^1-Z-H$.

16. The aqueous based paint or coating composition of claim 11 wherein the nitroalcohol compound of formula I is 2-nitro-2-methyl-1,3-propanediol (NMPD), 2-nitro-2-ethyl-1,3-propanediol (NEPD), or tris(hydroxymethyl)nitromethane (TN).

17. The aqueous based paint or coating composition of claim 11 wherein the polyisocyanate compound is 4,4' diisocyanato dicyclohexylmethane (H12MDI) or isophorone diisocyanate (IPDI).

18. The aqueous based paint or coating composition of claim 11 wherein the binder comprises about 20 wt % to about 55 wt % of the aqueous based paint or coating composition; the nitroalcohol compound of formula I is 2-nitro-2-ethyl-1,3-propanediol (NEPD) or tris(hydroxymethyl)nitromethane (TN); the polyol is a polyester polyol; and the polyisocyanate compound is 4,4'-diisocyanato dicyclohexylmethane (H12MDI) or isophorone diisocyanate (IPDI).

19. The aqueous based paint or coating composition of claim 18 wherein the polyol has a number average molecular weight of about 400 to 5000.

20. The aqueous based paint or coating composition of claim 1 wherein $R^1$ at each occurrence is $-(CH_2)_x-$, wherein x is 1.

21. The aqueous based paint or coating composition of claim 11 wherein $R^1$ at each occurrence is $-(CH_2)_x-$, wherein x is 1.

22. The aqueous based paint or coating composition of claim 1 wherein the binder comprises about 20 wt % to about 55 wt % of the aqueous based paint or coating composition; the nitroalcohol compound of formula I is 2-nitro-2-ethyl-1,3-propanediol (NEPD) or tris(hydroxymethyl)nitromethane (TN); the polyol is a polyester polyol; and the polyisocyanate compound is 4,4'-diisocyanato dicyclohexylmethane (H12MDI) or isophorone diisocyanate (IPDI).

* * * * *